United States Patent
Lei

(10) Patent No.: US 10,237,744 B2
(45) Date of Patent: Mar. 19, 2019

(54) BACKHAUL SIGNALING SUPPORT FOR UL-DL INTERFERENCE MANAGEMENT FOR TDD EIMTA

(71) Applicant: Nokia Technologies Oy, Espoo (FI)

(72) Inventor: Haipeng Lei, Beijing (CN)

(73) Assignee: Nokia Technologies Oy, Espoo (FI)

(*) Notice: Subject to any disclaimer, the term of this patent is extended or adjusted under 35 U.S.C. 154(b) by 93 days.

(21) Appl. No.: 15/025,785

(22) PCT Filed: Sep. 30, 2013

(86) PCT No.: PCT/CN2013/084683
§ 371 (c)(1),
(2) Date: Mar. 29, 2016

(87) PCT Pub. No.: WO2015/042935
PCT Pub. Date: Apr. 2, 2015

(65) Prior Publication Data
US 2016/0242038 A1 Aug. 18, 2016

(51) Int. Cl.
*H04W 16/10* (2009.01)
*H04L 5/00* (2006.01)
(Continued)

(52) U.S. Cl.
CPC .......... *H04W 16/10* (2013.01); *H04L 5/0035* (2013.01); *H04L 5/0053* (2013.01);
(Continued)

(58) Field of Classification Search
CPC . H04W 16/10; H04W 52/146; H04W 52/243; H04W 72/0446; H04W 72/1226;
(Continued)

(56) References Cited

U.S. PATENT DOCUMENTS

2010/0238888 A1 9/2010 Sampath et al.
2012/0069778 A1 3/2012 Zhang et al.
(Continued)

FOREIGN PATENT DOCUMENTS

CN 102215534 A 3/2012
CN 102387543 A 3/2012
(Continued)

OTHER PUBLICATIONS

Nokia, "Discussion on UL-DL interference mitigation for dynamic TDD UL-DL reconfigurations," R1-130487, Feb. 1, 2013, 3GPP.*
(Continued)

*Primary Examiner* — Jae Y Lee
(74) *Attorney, Agent, or Firm* — Mintz Levin Cohn Ferris Glovsky and Popeo, P.C.

(57) ABSTRACT

A method includes receiving information defining a PUCCH pattern to be used by a first UE to transmit a PUCCH to a first base station (BS). In response to PUCCH regions overlapping downlink regions in a downlink bandwidth to be used by the second BS for a downlink transmission to a second UE, performing the downlink transmission from the second BS to the second UE. The second BS performs downlink transmission avoidance by not scheduling downlink transmission in the downlink regions that overlap with the PUCCH regions or muting the downlink transmission or reconfiguring a subframe for uplink transmission. Another method includes transmitting, from a first BS, information defining the PUCCH pattern. Based on a response from a second BS, interference mitigation technique(s) are or are not performed by the first BS for an uplink transmission to be performed by the UE to transmit the PUCCH to the first BS.

20 Claims, 8 Drawing Sheets

(51) Int. Cl.
  *H04L 5/14* (2006.01)
  *H04W 72/04* (2009.01)
  *H04W 72/12* (2009.01)
  *H04W 52/14* (2009.01)
  *H04W 52/24* (2009.01)
  *H04W 48/12* (2009.01)
  *H04W 92/20* (2009.01)
  *H04L 1/18* (2006.01)

(52) U.S. Cl.
  CPC .......... *H04L 5/0055* (2013.01); *H04L 5/0073* (2013.01); *H04L 5/14* (2013.01); *H04L 5/1469* (2013.01); *H04W 52/146* (2013.01); *H04W 52/243* (2013.01); *H04W 72/0446* (2013.01); *H04W 72/1226* (2013.01); *H04W 72/1284* (2013.01); *H04L 1/1854* (2013.01); *H04L 5/0091* (2013.01); *H04W 48/12* (2013.01); *H04W 92/20* (2013.01)

(58) Field of Classification Search
  CPC ............. H04W 72/1284; H04L 5/0035; H04L 5/0053; H04L 5/0055; H04L 5/0073; H04L 5/14; H04L 5/1469
  See application file for complete search history.

(56) References Cited

U.S. PATENT DOCUMENTS

| | | | |
|---|---|---|---|
| 2012/0329400 | A1 | 12/2012 | Seo et al. |
| 2013/0301570 | A1* | 11/2013 | Xu .................... H04L 5/0073 370/329 |
| 2014/0133412 | A1* | 5/2014 | Jeniston ................ H04W 72/12 370/329 |
| 2014/0177486 | A1* | 6/2014 | Wang .................... H04L 5/0053 370/280 |
| 2015/0327324 | A1* | 11/2015 | Wei .................... H04W 52/0235 370/280 |
| 2016/0113007 | A1* | 4/2016 | Centonza ............. H04B 7/2656 370/280 |

FOREIGN PATENT DOCUMENTS

| | | |
|---|---|---|
| WO | 2012/118279 A1 | 9/2012 |
| WO | 2012/155323 A1 | 11/2012 |
| WO | 2013/089344 A1 | 6/2013 |
| WO | 2013/110218 A1 | 8/2013 |

OTHER PUBLICATIONS

3GPP, "Discussion on UL-DL interference mitigation for dynamic TDD UL-DL reconfigurations," R1-130487, Feb. 1, 2013.*

International Search Report and Written Opinion received for corresponding Patent Cooperation Treaty Application No. PCT/CN2013/084683, dated Jul. 7, 2014, 13 pages.

Samsung Inter-eNB Coordination of eIMTA 3GPP TSG RAN WG1 Meeting #74 Aug. 23, 2013. R-133089 pp. 1-2.

Susitaival et al., "Internet Access Performance in LTE TDD", IEEE 71st Vehicular Technology Conference, May 16-19, 2010, 5 Pages.

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423, V11.6.0, Sep. 2013, pp. 1-144.

"3rd Generation Partnership Project; Technical Specification Group Radio Access Network; Evolved Universal Terrestrial Radio Access (E-UTRA); Base Station (BS) radio transmission and reception (Release 12)", 3GPP TS 36.104, V12.1.0, Sep. 2013, pp. 1-139.

"New work item proposal for Further Enhancements to LTE TDD for DL-UL Interference Management and Traffic Adaptation", 3GPP TSG-RAN Meeting #58, RP-121772, Agenda: 13.1, CATT, Dec. 4-7, 2012, 15 pages.

Extended European Search Report received for corresponding European Patent Application No. 13894702.3, dated Apr. 28, 2017, 9 pages.

"Backhaul Signaling for Dynamic TDD UL-DL Reconfigurations", 3GPP TSG-RAN Working Group 1 meeting #74, R1-133365, Agenda: 7.2.3.1, LG Electronics, Aug. 19-23, 2013, pp. 1-5.

"Discussion on UL-DL interference mitigation for dynamic TDD UL-DL reconfigurations", 3GPP TSG-RAN Working Group 1 meeting #72, R1-130487, Agenda: 7.3.3.2, Nokia, Jan. 28-Feb. 1, 2013, 2 Pages.

"Performance Analysis of Interference Mitigation Schemes for TDD eIMTA", 3GPP TSG-RAN Working Group 1 meeting #73, R1-132228, Agenda: 6.2.3.1, LG Electronics, May 20-24, 2013, 7 Pages.

"Backhaul Signaling Support for ICIC in Dynamic TDD UL-DL Reconfigurations", 3GPP TSG-RAN Working Group 1 meeting #73, R1-132227, Agenda: 6.2.3.1, LG Electronics, May 20-24, 2013, 5 Pages.

* cited by examiner

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 1

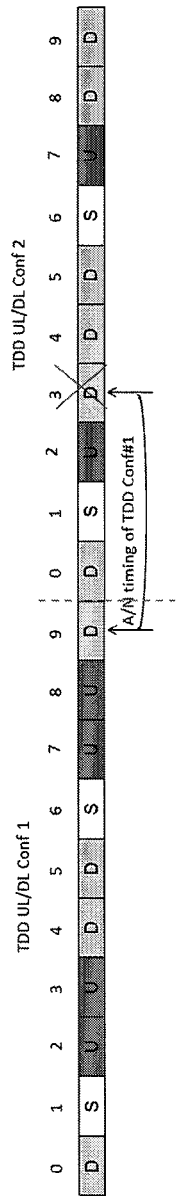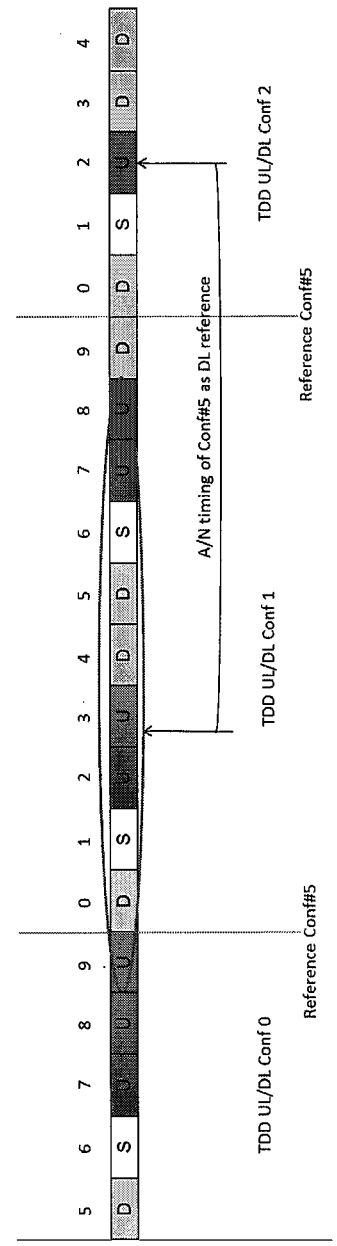
FIG. 3
FIG. 4

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 .. <maxCellineNB> | | Complete list of added cells served by the eNB | GLOBAL | reject |
| >Served Cell Information | M | | 9.2.8 | | – | – |
| >Neighbour Information | | 0 .. <maxnoofNeighbours> | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |
| >Information for eIMTA | | 0 . <maxnoofNeighbours> | | | - | |
| >>BandWidth | O | | INTEGER | Bandwidth of the neighbour cell. | – | – |
| >>PUCCHRegion | M | | INTEGER | PUCCH occupied PRB size of the neighbour cell, counted in single side from the edge of the neighbour cell band. | – | – |
| >>UL/DL reconfiguration set | M | 1, 2, 3 | INTEGER | Specified UL/DL reconfiguration set 1, 2, 3 etc. | | |
| Served Cells To Modify | | 0 .. <maxCellineNB> | | Complete list of modified cells served by the eNB | GLOBAL | reject |
| >Old ECGI | M | | ECGI 9.2.14 | This is the old E-UTRAN Cell Global Identifier | - | - |
| >Served Cell Information | M | | 9.2.8 | | – | – |
| >Neighbour Information | | 0 .. <maxnoofNeighbours> | | | – | – |
| >>ECGI | M | | ECGI 9.2.14 | E-UTRAN Cell Global Identifier of the neighbour cell | – | – |
| >>PCI | M | | INTEGER (0..503, ...) | Physical Cell Identifier of the neighbour cell | – | – |
| >>EARFCN | M | | 9.2.26 | DL EARFCN for FDD and EARFCN for TDD | – | – |

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 .. <maxCellineNB> | | | EACH | ignore |
| >>Cell ID | M | | ECGI 9.2.14 | Id of the source cell | – | – |
| >>UL Interference Overload Indication | O | | 9.2.17 | | – | – |
| >>UL High Interference Information | | 0 .. <maxCellineNB> | | | – | – |
| >>>Target Cell ID | M | | ECGI 9.2.14 | Id of the cell for which the HII is meant | – | – |
| >>>UL High Interference Indication | M | | 9.2.18 | | – | – |
| >>Relative Narrowband Tx Power (RNTP) | O | | 9.2.19 | | – | – |
| >>ABS Information | O | | 9.2.54 | | YES | ignore |
| >>Invoke Indication | O | | 9.2.55 | | YES | ignore |
| >Information for eIMTA | | 0 . <maxnoofNeighbours> | | | – | |
| >>BandWidth | O | | INTEGER | Bandwidth of the neighbour cell. | – | – |
| >>EARFCN | M | | 9.2.26 | EARFCN for TDD | | |
| >>PUCCHRegion | M | | INTEGER | PUCCH occupied PRB size of the neighbour cell, counted in single side from the edge of the neighbour cell band. | – | – |
| >>UL/DL reconfiguration set | M | 1, 2, 3 | INTEGER | Specified UL/DL reconfiguration set 1, 2, 3 etc. | | |

FIG. 8

BACKHAUL SIGNALING SUPPORT FOR UL-DL INTERFERENCE MANAGEMENT FOR TDD EIMTA

RELATED APPLICATION

This application was originally filed as Patent Cooperation Treaty Application No. PCT/CN2013/084683 filed Sep. 30, 2013.

TECHNICAL FIELD

This invention relates generally to 3GPP LTE-Advanced technology Rel-12 and, more specifically, relates to LTE TDD enhancement for DL-UL Interference Management and Traffic Adaptation (TDD eIMTA).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Currently, LTE TDD allows for asymmetric UL-DL allocations by providing seven different semi-statically configured TDD UL-DL configurations shown in FIG. 1. These allocations can provide between 40 percent and 90 percent DL subframes. A current mechanism for adapting UL-DL allocation is based on the system information change procedure with 640 ms period. The concrete TDD UL/DL configuration is semi-statically informed by SIB-1 signaling.

During a RAN #58 meeting, a new work item "Further Enhancements to LTE TDD for DL-UL Interference Management and Traffic Adaptation (LTE_TDD_eIMTA)" was approved. The related standardization work has been started since January 2013. In this work item, dynamic TDD UL/DL reconfiguration is a feature for LTE Rel-12 or beyond, whose motivation is to realize the flexibility to have dynamic TDD UL/DL configuration in a TDD system to match the uplink and downlink traffic variations. However, additional improvements could be made in order to realize this flexibility.

SUMMARY

This section contains examples of possible implementations and is not meant to be limiting.

In a first aspect, a method comprises receiving, via backhaul signaling, information defining a physical uplink control channel pattern to be used by a first user equipment to transmit a physical uplink control channel to a first base station, wherein the information is received from a network node and by a second base station. The method comprises, in response to a determination physical uplink control channel regions overlap downlink regions in a downlink bandwidth to be used by the second base station for a downlink transmission to a second user equipment, performing downlink transmission avoidance by the second base station by not scheduling downlink transmission in the downlink regions and downlink transmission that overlap with the physical uplink control channel regions or muting the downlink transmission or reconfiguring a subframe for uplink transmission.

A method as above, wherein the network node comprises the first base station and the receiving is performed using an X2 interface. A method as in the previous paragraph, wherein the receiving is performed using an S1 interface.

A method as above, wherein the information defining physical uplink control channel pattern comprises one or more of the following: operating bandwidth of the first base station; operating central frequency of the first base station; configured physical uplink control channel region size for the first base station; or a dynamic uplink-downlink reconfiguration set used by the first base station. The method of this paragraph, wherein the physical uplink control channel region size is in terms of a number of resource blocks.

A method as above, further comprising, prior to performing the downlink transmission, sending from the second base station to the first base station a response indicating one of scheduling avoidance is to be performed, no scheduling avoidance is to be performed, or there is no overlapping in regions of bandwidth.

A method as above, wherein: the method further comprises determining whether the physical uplink control channel regions overlap with the downlink regions in the downlink bandwidth to be used by the second base station for the downlink transmission to a second user equipment; and sending further comprises, in response to a determination the physical uplink control channel regions do not overlap the downlink regions, sending a response from the second base station toward the network node indicating that there will be no overlapping in the regions.

A method as above, wherein: the method further comprises determining whether the physical uplink control channel regions overlap with the downlink regions in the downlink bandwidth to be used by the second base station for the downlink transmission to a second user equipment; sending further comprises sending a response from the second base station toward the network node indicating that there will be scheduling avoidance; and the method further comprises, in response to a determination the physical uplink control channel regions overlap the downlink regions, performing one of not scheduling downlink transmission in the downlink regions that overlap with the physical uplink control channel regions or muting the downlink transmission.

A method as above, wherein: the method further comprises determining whether the physical uplink control channel regions overlap with the downlink regions in the downlink bandwidth to be used by the second base station for the downlink transmission to a second user equipment; the method further comprises, in response to a determination the physical uplink control channel regions overlap the downlink regions, performing reconfiguring the subframe for uplink transmission; and sending further comprises sending a response from the second base station toward the network node indicating that there will be scheduling avoidance.

A method as above, wherein: the information defining the physical uplink control channel pattern comprises a current uplink-downlink reconfiguration set; the method further comprises, in response to a determination by the second base station that physical uplink control channel protection will not be performed, not performing the downlink transmission avoidance for the current uplink-downlink reconfiguration set; and sending further comprises sending a response from the second base station toward the network node indicating that there will be no scheduling avoidance.

A method as above, further comprising the second base station performing the following: selecting, from an uplink-downlink reconfiguration set of indications of uplink-downlink configurations, an uplink-downlink configuration with a highest number of downlink subframes; determining one or more uplink subframe numbers in the selected uplink-downlink configuration; in response to the one or more uplink subframe numbers only being uplink subframes in all time-division duplex uplink-downlink configurations, not performing the downlink transmission avoidance for this uplink-downlink reconfiguration set; and in response to the one or more uplink subframe numbers comprising uplink subframes other than uplink subframe only being uplink in all time-division duplex uplink-downlink configurations, performing the downlink transmission avoidance for this uplink-downlink reconfiguration set.

A method as above, performed by the second base station.

In this aspect, an apparatus comprises one or more processors and one or more memories including computer program code. The one or more memories and the computer program code are configured, with the one or more processors, to cause the apparatus to perform any of the methods as above.

In this aspect, an apparatus comprises: means for receiving, via backhaul signaling, information defining a physical uplink control channel pattern to be used by a first user equipment to transmit a physical uplink control channel to a first base station, wherein the information is received from a network node and by a second base station; and means, responsive to a determination physical uplink control channel regions overlap downlink regions in a downlink bandwidth to be used by the second base station for a downlink transmission to a second user equipment, for performing downlink transmission avoidance by the second base station by not scheduling downlink transmission in the downlink regions in the downlink bandwidth that overlap with the physical uplink control channel regions or muting the downlink transmission or reconfiguring a subframe for uplink transmission.

The apparatus as above, wherein the network node comprises the first base station and the receiving is performed using an X2 interface. The apparatus of the previous paragraph, wherein the receiving is performed using an S1 interface.

The apparatus as above, wherein the information defining physical uplink control channel pattern comprises one or more of the following: operating bandwidth of the first base station; operating central frequency of the first base station; configured physical uplink control channel region size for the first base station; or a dynamic uplink-downlink reconfiguration set used by the first base station. The apparatus of this paragraph, wherein the physical uplink control channel region size is in terms of a number of resource blocks.

The apparatus as above, further comprising means for sending, prior to performing the downlink transmission, from the second base station to the first base station a response indicating one of scheduling avoidance is to be performed, no scheduling avoidance is to be performed, or there is no overlapping in regions of bandwidth.

The apparatus as above, wherein: the apparatus further comprises means for determining whether the physical uplink control channel regions overlap with the downlink regions in the downlink bandwidth to be used by the second base station for the downlink transmission to a second user equipment; and the means for sending further comprises, in response to a determination the physical uplink control channel regions do not overlap the downlink regions, means for sending a response from the second base station toward the network node indicating that there will be no overlapping in the regions.

The apparatus as above, wherein: the apparatus further comprises means for determining whether the physical uplink control channel regions overlap with the downlink regions in the downlink bandwidth to be used by the second base station for the downlink transmission to a second user equipment; the means for sending further comprises means for sending a response from the second base station toward the network node indicating that there will be scheduling avoidance; and the apparatus further comprises means, responsive to a determination the physical uplink control channel regions overlap the downlink regions, for performing one of not scheduling downlink transmission in the downlink regions that overlap with the physical uplink control channel regions or muting the downlink transmission.

The apparatus as above, wherein: the apparatus further comprises means for determining whether the physical uplink control channel regions overlap with the downlink regions in the downlink bandwidth to be used by the second base station for the downlink transmission to a second user equipment; and the apparatus further comprises means, responsive to a determination the physical uplink control channel regions overlap the downlink regions, for performing reconfiguring the subframe for uplink transmission; and the means for sending further comprises means for sending a response from the second base station toward the network node indicating that there will be scheduling avoidance.

The apparatus as above, wherein: the information defining the physical uplink control channel pattern comprises a current uplink-downlink reconfiguration set; the apparatus further comprises means, responsive to a determination by the second base station that physical uplink control channel protection will not be performed, for not performing the downlink transmission avoidance for the current uplink-downlink reconfiguration set; and the means for sending further comprises means for sending a response from the second base station toward the network node indicating that there will be no scheduling avoidance.

The apparatus as above, further comprising, in the second base station: means for selecting, from an uplink-downlink reconfiguration set of indications of uplink-downlink configurations, an uplink-downlink configuration with a highest number of downlink subframes; means for determining one or more uplink subframe numbers in the selected uplink-downlink configuration; means, responsive to the one or more uplink subframe numbers only being uplink subframes in all time-division duplex uplink-downlink configurations, for not performing the downlink transmission avoidance for this uplink-downlink reconfiguration set; and means, responsive to the one or more uplink subframe numbers comprising uplink subframes other than uplink subframe only being uplink in all time-division duplex uplink-downlink configurations, for performing the downlink transmission avoidance for this uplink-downlink reconfiguration set.

The apparatus as above, wherein the apparatus comprises the second base station.

In a second aspect, a method comprises: transmitting, from a first base station toward a second base station and using backhaul signaling, information defining a physical uplink control channel pattern to be used by a user equipment to transmit a physical uplink control channel to the first base station; receiving a response from the second base station; and based on the response, performing or not performing one or more interference mitigation techniques for an uplink transmission to be performed by user equipment to transmit the physical uplink control channel to the first base station.

A method as above, wherein the information defining physical uplink control channel pattern comprises one or more of the following: operating bandwidth of the first base station; operating central frequency of the first base station; configured physical uplink control channel region size for the first base station; or a dynamic uplink-downlink reconfiguration set used by the first base station.

A method as above, wherein: the user equipment is a first user equipment; the response comprises an indication the second base station will perform scheduling avoidance or there is no overlap between a bandwidth to be used by the first user equipment in the uplink transmission and a bandwidth to be used by the second base station in a downlink transmission to a second user equipment; and the one or more interference mitigation techniques are not performed by the first base station.

A method as above, wherein: the response comprises an indication the second base station will not perform scheduling avoidance; and the one or more interference mitigation techniques are performed by the first base station.

A method as in the previous paragraph, wherein: the one or more interference mitigation techniques comprise signaling the first user equipment to perform a power boosting for the uplink transmission so that power used in the uplink transmission is increased from an originally determined power to a power that is higher than the originally determined power; and the method further comprises receiving at the first base station the uplink transmission from the first user equipment on the physical uplink control channel. A method as in the previous paragraph, wherein: the one or more interference mitigation techniques comprise improving a reliability of the physical uplink control channel; and the method further comprises receiving at the first base station the uplink transmission from the first user equipment on the physical uplink control channel.

A method as above, performed by the first base station.

In this second aspect, an apparatus comprises one or more processors and one or more memories including computer program code. The one or more memories and the computer program code are configured, with the one or more processors, to cause the apparatus to perform any of the methods as above.

An apparatus for the second aspect comprises: means for transmitting, from a first base station toward a second base station and using backhaul signaling, information defining a physical uplink control channel pattern to be used by a user equipment to transmit a physical uplink control channel to the first base station; means for receiving a response from the second base station; and means, based on the response, for performing or not performing one or more interference mitigation techniques for an uplink transmission to be performed by the user equipment to transmit the physical uplink control channel to the first base station.

An apparatus as above, wherein the information defining physical uplink control channel pattern comprises one or more of the following: operating bandwidth of the first base station; operating central frequency of the first base station; configured physical uplink control channel region size for the first base station; or a dynamic uplink-downlink reconfiguration set used by the first base station.

An apparatus as above, wherein: the user equipment is a first user equipment; the response comprises an indication the second base station will perform scheduling avoidance or there is no overlap between a bandwidth to be used by the first user equipment in the uplink transmission and a bandwidth to be used by the second base station in a downlink transmission to a second user equipment; and the one or more interference mitigation techniques are not performed by the first base station.

An apparatus as above, wherein: the response comprises an indication the second base station will not perform scheduling avoidance; and the one or more interference mitigation techniques are performed by the first base station. The apparatus of this paragraph, wherein: the one or more interference mitigation techniques comprise signaling the first user equipment to perform a power boosting for the uplink transmission so that power used in the uplink transmission is increased from an originally determined power to a power that is higher than the originally determined power; and the apparatus further comprises means for receiving at the first base station the uplink transmission from the first user equipment on the physical uplink control channel. The apparatus of this paragraph, wherein: the one or more interference mitigation techniques comprise improving a reliability of the physical uplink control channel; and the apparatus further comprises means for receiving at the first base station the uplink transmission from the first user equipment on the physical uplink control channel.

An apparatus as above, wherein the apparatus comprises the first base station.

A system comprising one or more apparatus as described above.

A computer program comprises program code for executing the method according to any of the methods above. The computer program according to this paragraph, wherein the computer program is a computer program product comprising a computer-readable medium bearing computer program code embodied therein for use with a computer.

BRIEF DESCRIPTION OF THE DRAWINGS

In the attached Drawing Figures:

FIG. 1 illustrates the current seven kinds of TDD UL/DL configurations;

FIG. 3 illustrates a HARQ timing problem in TDD eIMTA;

FIG. 4 illustrates UL/DL configuration 5 as a DL reference configuration in TDD eIMTA;

FIGS. 6A and 6B, is a block diagram of an exemplary signaling and logic flow diagram for backhaul signaling support for UL-DL interference management for TDD eIMTA, and that illustrates the operation of an exemplary method, a result of execution of computer program instructions embodied on a computer readable memory, and/or functions performed by logic implemented in hardware, in accordance with exemplary embodiments herein;

FIG. 7 is an example of a portion of a modified ENB CONFIGURATION UPDATE message, where the original message is from section 9.1.2.8 of 3GPP TS 36.423 V11.6.0 (2013 September); and FIG. 8 is an example of a modified LOAD INFORMATION message, where the original message is from section 9.1.2.1 of 3GPP TS 36.423 V11.6.0 (2013 September).

DETAILED DESCRIPTION OF THE DRAWINGS

The exemplary embodiments herein describe techniques for backhaul signaling support for UL-DL interference management for TDD eIMTA. Additional description of problems associated with conventional systems and of these techniques are presented after a system into which the exemplary embodiments may be used is described.

Figure 2:
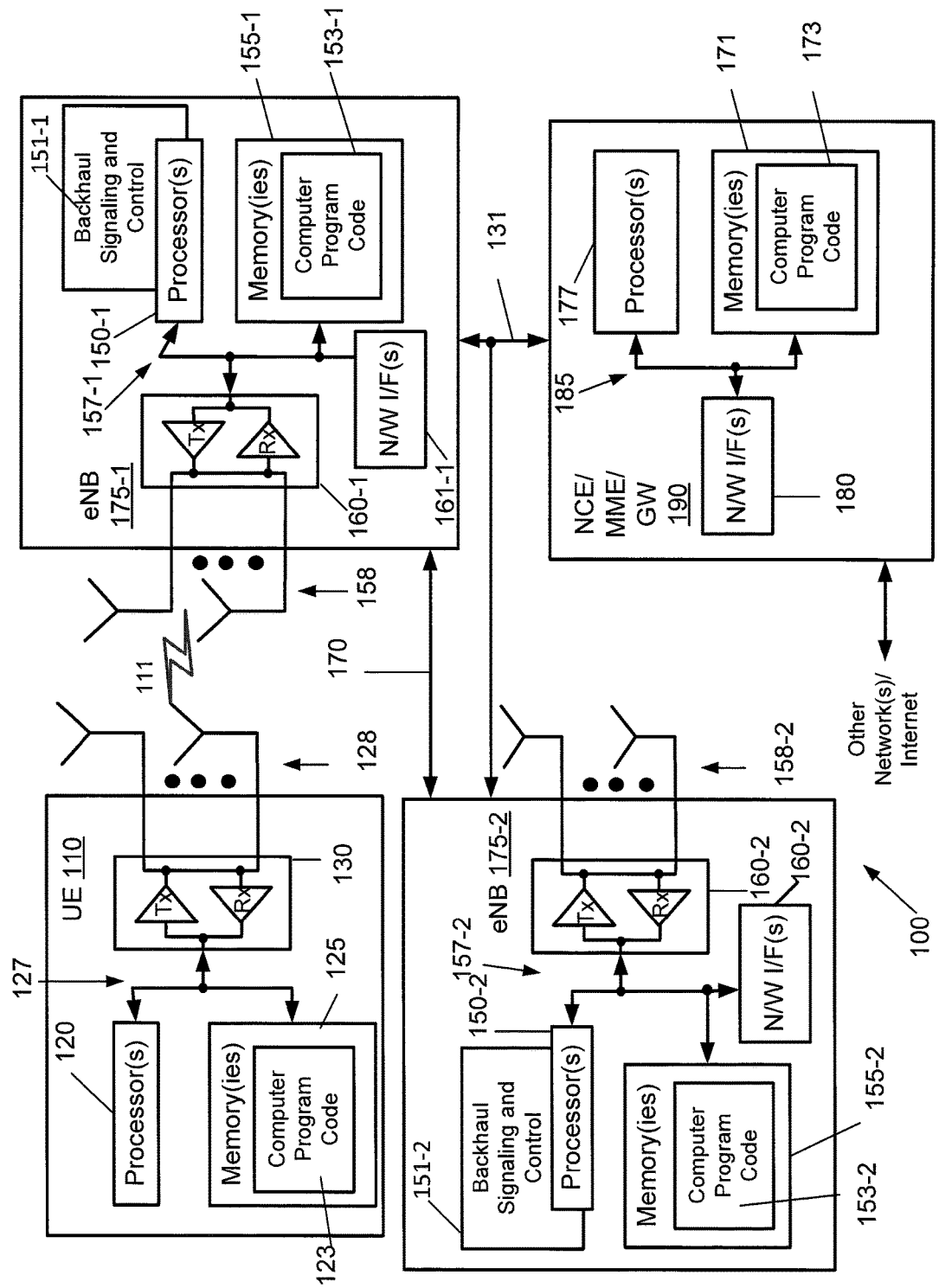
FIG. 2 is a block diagram of an exemplary system in which the exemplary embodiments may be practiced.

Turning to FIG. 2, this figure shows a block diagram of an exemplary system in which the exemplary embodiments may be practiced. In FIG. 2, a UE 110 is in wireless communication with a network 100. The user equipment 110 includes one or more processors 120, one or more memories 125, and one or more transceivers 130 (comprising one or more transmitters, Tx, and one or more receivers, Rx) interconnected through one or more buses 127. The one or more transceivers 130 are connected to one or more antennas 128. The one or more memories 125 include computer program code 123. The UE 110-1 communicates with eNB 175-1 (which is a base station) via wireless link 111.

There are two eNBs 175 shown in FIG. 2. Each of the eNBs 175 includes one or more processors 150, one or more memories 155, one or more network interfaces (N/W I/F(s)) 161, and one or more transceivers 160 (comprising one or more transmitters, Tx, and one or more receivers, Rx) interconnected through one or more buses 157. The one or more transceivers 160 are connected to one or more antennas 158. The one or more memories 155 include computer program code 153. Each of the eNBs 175 further includes a backhaul signaling and control unit 151 that causes its respective eNB 175 to perform operations as described herein. In an exemplary embodiment, the one or more memories 155 and the computer program code 153 are configured to, with the one or more processors 150, cause a corresponding eNB 175 to perform one or more of the operations as described herein. In another example, the backhaul signaling and control unit 151 is formed at least in part as circuitry, e.g., in the one or more processors 150. The one or more network interfaces 161 communicate over a network such as the networks 170 and 131. Two or more eNBs 175 communicate using, e.g., network 170. The network 170 may be wired or wireless or both and may implement, e.g., an X2 interface.

The wireless network 100 may include a network control element (NCE) 190 that may (or may not) include MME/SGW functionality, and which provides connectivity with a further network, such as a telephone network and/or a data communications network (e.g., the Internet). The eNBs 175 are coupled via a network 131 to the NCE 175. The network 131 may be implemented as, e.g., an S1 interface. The NCE 190 includes one or more processors 177, one or more memories 171, and one or more network interfaces (N/W I/F(s)) 180, interconnected through one or more buses 185. The one or more memories 171 include computer program code 173. In an exemplary embodiment, the one or more memories 171 and the computer program code 173 are configured to, with the one or more processors 175, cause the NCE 190 to perform one or more operations described herein.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 177 may be of any type suitable to the local technical environment, and may include one or more of general purpose computers, special purpose computers, microprocessors, digital signal processors (DSPs) and processors based on a multi-core processor architecture, integrated circuits (e.g., designed to carry out one or more of the operations herein), and programmable modules such as field-programmable gate arrays (e.g., designed to carry out one or more of the operations herein), as non-limiting examples.

Concerning problems with conventional systems, in TDD eIMTA, UL-DL configuration is dynamically changed for traffic adaptation. Consequently, HARQ timing problems may occur.

One example is shown in FIG. 3, in case of TDD UL/DL configuration 1 (one), if UE 110 receives PDSCH in DL subframe 9, the UE 110 shall transmit corresponding A/N on PUCCH in UL subframe 3 in next radio frame according to currently specified LTE HARQ timing rules. However, if the current TDD UL/DL configuration is switched to TDD UL/DL configuration 2 to adapt to traffic fluctuation, and then subframe 3 in the next radio frame will be a DL subframe. Then the UE 110 cannot feedback A/N in subframe 3 and needs to find another uplink subframe to transmit A/N.

In order to solve HARQ timing problems, the reference configuration approach is considered in TDD eIMTA with two options listed below:
Option 1: fixed or semi-static reference configuration; or
Option 2: dynamic reference configuration based on the practical UL-DL configurations before and after a reconfiguration boundary.

According to Option 1, in the dynamic UL/DL reconfiguration set, the UL-DL configuration with the most DL subframes is selected as the DL reference configuration for DL HARQ timing no matter which UL-DL configuration is actually used. As shown in FIG. 4, in case of TDD UL/DL configuration 5 as DL reference configuration, if the UE 110 receives PDSCH in the subframe set from subframe 9 of previous radio frame to subframe 8 of current radio frame, then the UE 110 shall transmit corresponding A/N on PUCCH in UL subframe 2 in next radio frame according to currently specified LTE HARQ timing rules, which is illustrated by the oval as shown in FIG. 4.

However, it is noted that in case UL-DL configuration #5 is selected as DL reference configuration, the maximum number of aggregated carriers is limited to two in the current specification. So DL peak data rate is limited greatly. Moreover, UL-DL configuration #5 will force HARQ-ACK bits corresponding to all DL transmissions to be transmitted on a single UL subframe, which will cause unbalanced PUCCH overhead. Additionally, only HARQ-ACK bundling and PUCCH format 3 can be supported for UL/DL configuration 5. HARQ-ACK bundling will lead to unnecessary DL throughput loss while PUCCH format 3 may limit the coverage and no all UEs can support PUCCH format 3.

In Option 2, dynamic reference configuration is determined according to actual UL-DL configurations before and after a reconfiguration boundary. Every time that UL-DL reconfiguration occurs, both the network (e.g., via eNB 175) and the UE will tune the HARQ timing. Especially with the agreement of explicit common UL/DL configuration indicated in each frame and the merits of ACK/NACK bits in balanced UL subframe, Option 2 seems more flexible than Option 1.

However, in Option 2, since an ACK/NACK bit is transmitted in UL according to a dynamic DL reference configuration, the ACK/NACK bit may be transmitted in flexible subframes, i.e., a subframe 3, 4, 7, 8 or 9. Then the ACK/NACK bits may suffer severe interference from the neighboring cell's downlink transmission. So the reliability of ACK/NACK bits needs to be guaranteed.

Figure 5:
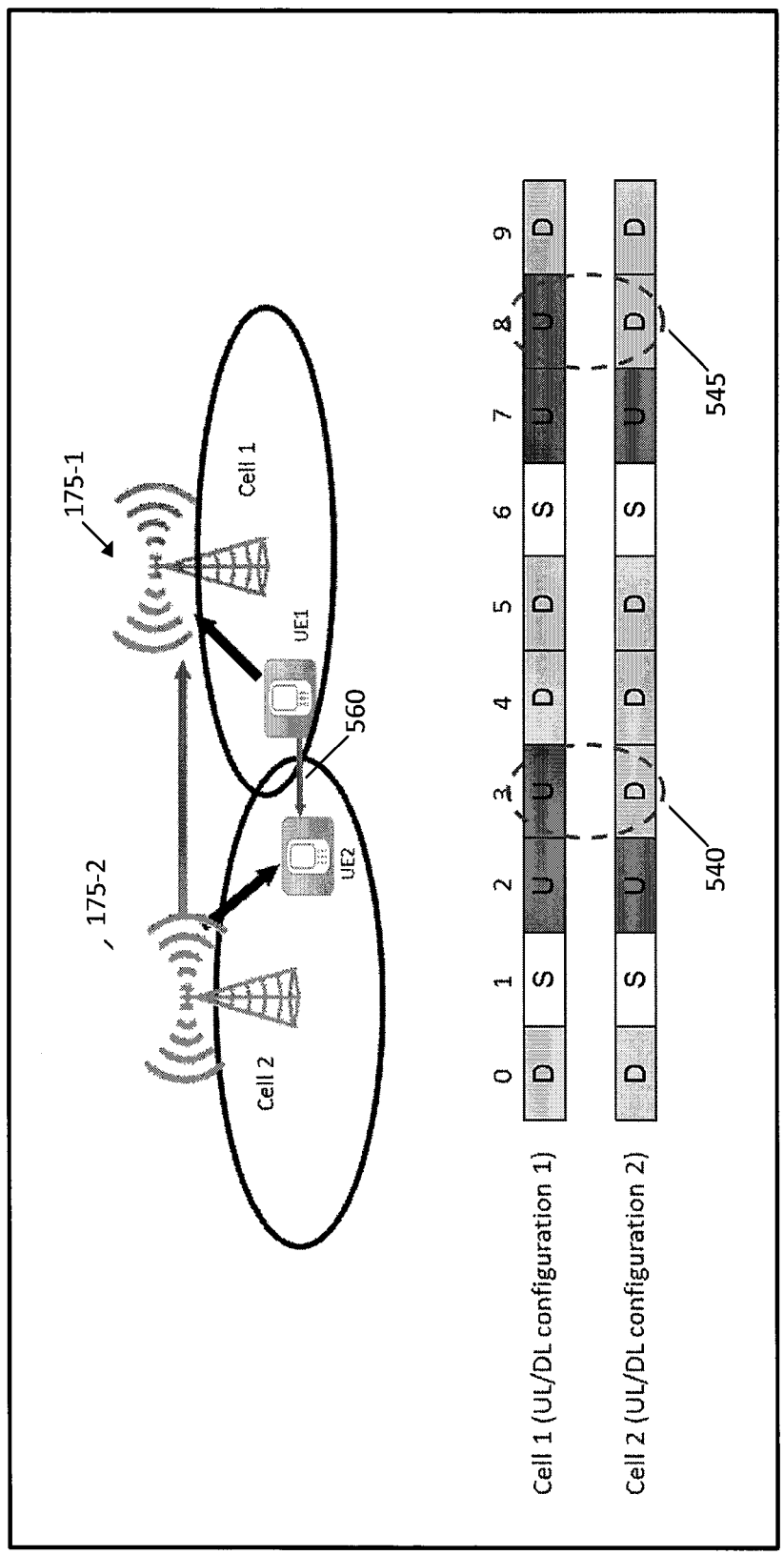
FIG. 5 shows an UL ACK/NACK transmission suffering severe interference from a neighboring cell.

Additionally, considering the TDD eIMTA feature can benefit in low or medium traffic load cases, this feature is activated on a cell-by-cell basis. Therefore, if one cell activates the feature but its neighboring cell does not, then the two neighboring cells will suffer UL-DL interference. One example is shown in FIG. 5. FIG. 5 shows a cell 510-1 formed by eNB 175-1 and a cell 510-2 formed by eNB 175-2.

At the beginning, cell 1 510-1 and cell 2 510-2 are working in fixed TDD mode and UL/DL configuration 1 is used due to balanced UL and DL resource ratios (that is, there are four UL and six DL subframes, including special subframes, in UL/DL configuration 1). If more DL traffic needs to be delivered more timely in cell 2 510-2, the eNB 175-2 for cell 2 510-2 can activate its TDD eIMTA mode and adopt TDD UL/DL configuration 2. This is illustrated by cell 2 510-2 being in UL-DL configuration 2 (which allows 8 DL subframes, when special subframes are included as DL subframes) and cell 1 510-1 being in (i.e., remaining in) UL-DL configuration 1. Then when the ACK/NACK information of cell 1 510-1 is transmitted in UL subframe 3 or 8, the cell 1 510-1 will suffer severe interference from cell 2 510-2 due to different UL/DL configurations adopted between neighboring cells. That is, the serving link 520 from the eNB 175-2 in downlink to the UE 110-2 in subframes 3 (see reference 540 in FIG. 5) and 8 (see reference 545 in FIG. 5) causes UL-DL interference 530 to cell 1 510-1, which is performing UL communications from the UE 110-1 to the eNB 175-1 via a link 555 in these subframes. Furthermore, the UE 110-1 causes interference 560 to the UE 110-2 for these communications.

This issue has previously been conventionally attempted to be solved by always using TDD UL/DL configuration 5 as a DL reference configuration, which can force all the ACK/NACK bits to be transmitted in UL subframe 2. UL subframe 2 is a fixed UL subframe (that is, for all the UL/DL configurations in FIG. 1, subframe 2 is always UL) and does not suffer the interference from neighboring cell's downlink transmission. However, this method will cause the problems of unbalanced ACK/NACK in uplink subframes and a limitation of aggregated carriers, as well as unnecessary DL performance loss.

Another conventional attempt at solving this problem is to use UL transmission power boosting for ACK/NACK transmission in UL to combat the interference from downlink transmissions of neighboring cells. Considering the high transmission power of the eNB's downlink and power limitations at the UE side, boosted transmission power may not be high enough to mitigate this interference from the neighboring cell's downlink transmission and lead to too much UE power consumption.

By contrast, the exemplary embodiments herein propose to use backhaul signaling to mitigate UL-DL interference and improve PUCCH reliability for TDD eIMTA.

The details presented below are summarized as the following non-limiting examples:

In case to improve PUCCH reliability, a PUCCH pattern to facilitate the PUCCH transmission is transmitted from one eNB (e.g., eNB 175-1) to its neighboring eNB (e.g., eNB 175-2) via backhaul signaling (e.g., X2 interface) to indicate such exemplary items as the following:
  operating bandwidth;
  operating central frequency (e.g., ARFCN);
  configured PUCCH region size (e.g., in terms of RB number); and/or
  dynamic UL/DL reconfiguration set.

Upon receiving the PUCCH pattern, the eNB2 175-2 will act to perform the following in an exemplary embodiment:
1) select the TDD UL/DL configurations having the most DL subframes in the frame from the indicated dynamic UL/DL reconfiguration set;
2) record the UL subframe number of the selected configuration; and
3) check the recorded UL subframe number:
  i) if only UL subframe 2 is recorded, no related behavior is needed;
  ii) if other UL subframes besides UL subframe 2 are also recorded, then further check the overlapping operating bandwidth in the PUCCH region:
    a) if eNB2's operating bandwidth has no overlapping in the PUCCH region of eNB1 175-2, then the eNB2 175-2 sends a response to eNB1 175-1 via backhaul signaling to confirm there is no overlapping on eNB1's PUCCH region; or
    b) if the operating bandwidth of eNB2 175-2 is larger than or equal to that of the operating bandwidth of eNB1 175-1, then eNB2 175-2 shall avoid scheduling PDSCH or ePDCCH on that informed PUCCH region or mute the DL transmission in the DL subframe with the same subframe number of the recorded UL subframes except UL subframe 2 or reconfigure this subframe for UL transmission to protect PUCCH of eNB1 175-1. A response is sent to eNB1 175-1 via backhaul signaling to confirm the scheduling avoidance. It is noted that UL-UL interference has been known to exist, when two cells are performing UL transmission in same subframe, since LTE Rel-8. Compared to this UL-UL interference, interference from neighboring cell downlink transmission is more severe for an UL transmission that occurs at the same time as the downlink transmission. So the emphasis of TDD eIMTA is to mitigate UL-DL interference.

Detailed examples are now presented. From the viewpoint of performance, it is beneficial to support all existing seven UL-DL configurations for TDD eIMTA. However, complicated HARQ timing occurs when an UL/DL configuration with 5 ms switching point is changed to an UL/DL configuration with 10 ms switching point or vice versa. Additionally, some UL/DL configurations provide quite similar UL/DL resource ratios. Hence, the UL/DL configuration set can be semi-statically configured. So, in an exemplary embodiment, may be three UL/DL reconfiguration sets (where each number in a set corresponds to an UL/DL configuration in FIG. 1):
  Set 1: TDD UL/DL configuration {0, 1, 2, 6};
  Set 2: TDD UL/DL configuration {3, 4, 5}; and
  Set 3: TDD UL/DL configuration {0, 1, 2, 3, 4, 5, 6}.

The concrete dynamic UL/DL reconfiguration set to be used for TDD eIMTA needs to be exchanged between neighboring cells then the DL and UL reference configuration can be derived by a neighboring cell to select the UL/DL configuration having the most DL subframes in the reconfiguration set as a DL reference configuration and the UL/DL configuration having the most UL subframes in the reconfiguration set as UL reference configuration. For example, in Set 1, UL/DL configuration 2 and 0 are used as DL and UL reference configuration, respectively; in Set 2, UL/DL configuration 5 and 3 are used as DL and UL reference configuration, respectively; in Set 3, UL/DL configuration 5 and 0 are used as DL and UL reference configuration, respectively. It is not intended to limit the scope of this invention only to these three sets. Other sets can be supported as such.

Based on the indicated dynamic UL/DL reconfiguration set, the receiving eNB 175 shall know which subframe is fixed or flexible in the sending cell and adopt corresponding UL-DL interference mitigation schemes, e.g., DL power reduction or UL power boosting and the like. This is a merit of exchanging a dynamic UL/DL reconfiguration set.

Meanwhile, based on the selected DL reference configuration, the receiving eNB 175 can know which UL subframe of the sending eNB may be used for PUCCH transmission. For example, if Set 1 is indicated, then UL/DL configuration 2 is used as DL reference configuration and UL subframes 2 and 7 will be used for PUCCH transmission; if Set 3 is indicated, then UL/DL configuration 5 is used as DL reference configuration and UL subframe 2 will be used for PUCCH transmission.

Then, the receiving eNB should record the UL subframe number of the selected DL reference configuration and check the subframe number. For example, if only UL subframe 2 is recorded, no related behavior is needed because UL subframe 2 suffers no UL-DL interference; if another UL subframes besides UL subframe 2 are also recorded, e.g., subframe 7 in case UL/DL reconfiguration Set 1 is indicated, then the receiving eNB should further check the overlapping in PUCCH region according to, e.g., operating bandwidth, central frequency and configured PUCCH region size. In exemplary detail, if eNB2's operating bandwidth has no overlapping bandwidth in the PUCCH region of the eNB1, then the eNB2 sends a response to the eNB1 via backhaul signaling to confirm there is no overlapping on eNB1's PUCCH region. Meanwhile, if the operating bandwidth of eNB2 is larger than or equal to the operating bandwidth of eNB1, then the eNB2 shall avoid scheduling PDSCH or ePDCCH on that informed PUCCH region or mute the DL transmission in the DL subframe with the same number of the recorded UL subframes except UL subframe 2 (e.g., subframe 7) or reconfigure the recorded subframe(s) for UL transmission to protect PUCCH of the eNB1. Usually, DL reference configurations #2 and 5 are the most favored DL reference configurations. If DL reference configuration #2 is used, then UL subframes 2 and 7 are used for PUCCH transmission. A response is sent to eNB1 via backhaul signaling to confirm the scheduling avoidance.

Regarding the operating bandwidth, LTE supports a set of transmission bandwidths including 1.4 MHz, 3 MHz, 5 MHz, 10 MHz, 15 MHz and 20 MHz.

PUCCH is semi-statically configured by eNB. Then an eNB 175 can share, e.g., its own cell bandwidth information, central frequency and PUCCH region size with its neighboring cell. This kind of message can be transmitted via, e.g., the X2 or S1 interface. Usually, the PUCCH region size is in term of resource blocks (RBs). It is noted that PUCCH is configured at two edges of the frequency band. So only the message of cell bandwidth and the number of RB configured for PUCCH are needed to share with a neighboring cell if the two cells have same operating bandwidth. After receiving this message, the neighboring cell shall, in an exemplary embodiment, avoid scheduling PDSCH or ePDCCH on that region or mute the DL transmission in the downlink subframes or reconfigure UL transmission in the subframe derived from dynamic UL/DL reconfiguration set to protect PUCCH against the interference from downlink transmission if there is overlapping in the PUCCH region between two cells.

Therefore, at the side of cell 2, if cell 2's operating bandwidth is larger than or equal to the operating bandwidth of cell 1 then cell 2 avoids scheduling PDSCH or ePDCCH only in subframe 7 (derived from dynamic UL/DL reconfiguration set) in the frequency band edge with ⌈N/2⌉ RBs in each side or mute the DL transmission in subframe 7 or reconfiguration subframe 7 for UL transmission in order to protect PUCCH of cell 1. However, if cell 2's operated bandwidth is smaller than that of cell 1 and there is no overlapping in the PUCCH region between the two cells, then cell 2 is not needed to avoid scheduling PDSCH or ePDCCH on that region in subframe 7 or mute the DL transmission in subframe 7 or reconfigure subframe 7 for UL transmission. This is especially true in macro-small cell scenarios when the macro and small cell are operated with different bandwidth.

Figure 6:
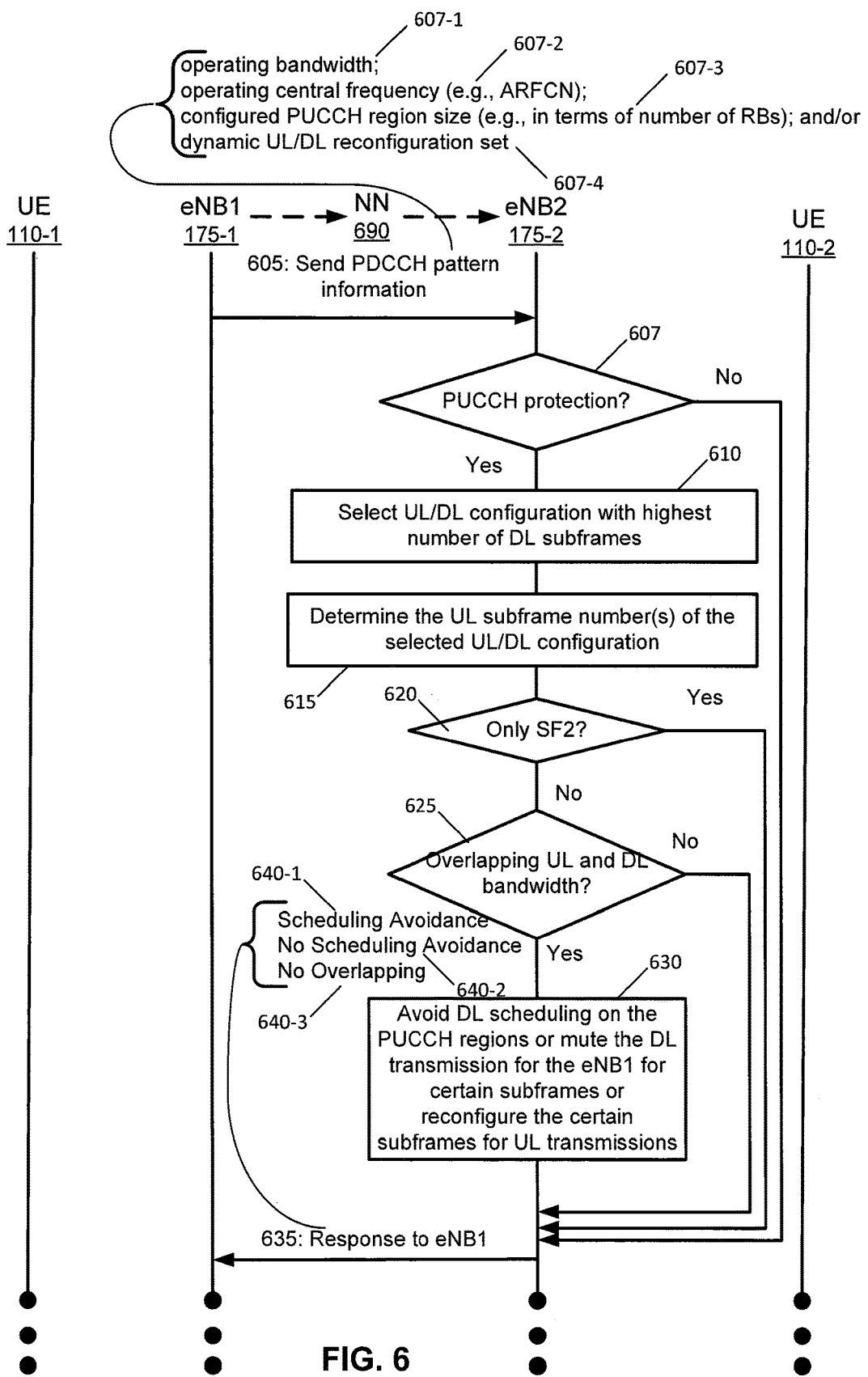
FIG. 6, including
Figure 6:
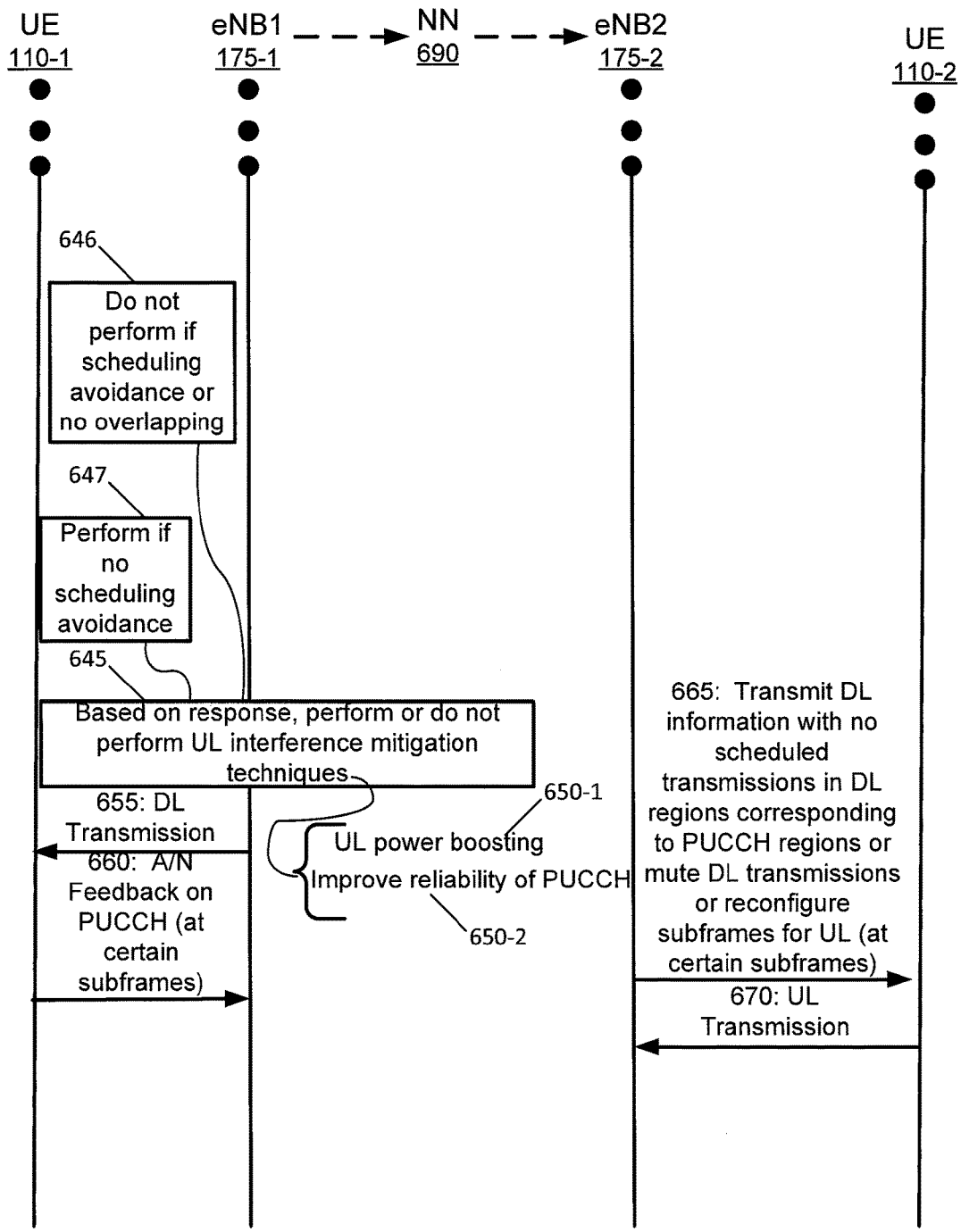

An exemplary procedure is shown in FIG. 6, which includes both FIGS. 6A and 6B. FIG. 6 is a block diagram of an exemplary signaling and logic flow diagram for backhaul signaling support for UL-DL interference management for TDD eIMTA. This figure further illustrates the operation of an exemplary method, a result of execution of computer program instructions embodied on a computer readable memory, and/or functions performed by logic implemented in hardware, in accordance with exemplary embodiments herein. The blocks in FIG. 6 may be considered to be interconnected means for performing the functions in the blocks. It is assumed the eNBs 175 perform the blocks in FIG. 6, e.g., under control of a corresponding backhaul signaling and control unit 151.

In signaling 605, the eNB1 175-1 sends PUCCH pattern information 607 to eNB2 via, e.g., the X2 interface. The PUCCH pattern information 607 is information of the PUCCH pattern for the eNB1 and may include one or more of the following: operating bandwidth 607-1; operating central frequency (e.g., ARFCN) 607-2; PUCCH region size (e.g., in terms of number of RBs) 607-3; and/or a dynamic UL/DL reconfiguration set 607-4. As described above, the UL/DL reconfiguration set may include the following sets: Set 1: TDD UL/DL configuration {0, 1, 2, 6}; Set 2: TDD UL/DL configuration {3, 4, 5}; Set 3: TDD UL/DL configuration {0, 1, 2, 3, 4, 5, 6}; or other possible sets.

In response to reception of the PDCCH pattern information 605, in block 607, the eNB2 determines whether the eNB2 will undertake PUCCH protection. That is, there may be situations where the eNB2 will not choose to undertake PUCCH protection for eNB1, such as if there is a very high DL traffic load required by the eNB2. If the eNB2 chooses not to undertake PUCCH protection (block 607=No), the flow proceeds to backhaul signaling 635. This backhaul signaling 635 includes a response 640, which in this example is no scheduling avoidance 640-2. The response 640 of no scheduling avoidance 640-2 means the eNB2 shall neglect the PUCCH protection of eNB1. Then, eNB1 needs to use UL power boosting or improve the reliability of its PUCCH, as described below.

If the eNB2 chooses to undertake PUCCH protection (block 607=Yes), the flow proceeds to block 610. In block 610, the eNB2 175-2 selects the TDD UL/DL configuration with a highest number of DL subframes from the indicated dynamic UL/DL reconfiguration set.

In block 615, the eNB2 175-2 determines the UL subframe number(s) for the selected TDD UL/DL configuration. If only UL subframe 2 is determined (block 620=Yes), no related behavior is needed and the flow proceeds to backhaul signaling 635. The eNB2 signals 635 to the eNB1 a response 640 indicating there is no overlapping 640-3. It is noted that block 620, in an exemplary embodiment, means that if one or more uplink subframe numbers (in the example of FIG. 6, subframe 2) are only uplink subframes in all time-division duplex uplink-downlink configurations, then the downlink transmission avoidance is not performed for protection of physical uplink control channel (e.g., since there should be only uplink transmissions for both eNB1 and eNB2). Meanwhile, in response to the one or more uplink subframe numbers comprising uplink subframes other than uplink subframe only being uplink in all time-division duplex uplink-downlink configurations, then the downlink transmission avoidance would be performed for protection of physical uplink control channel (e.g., as there would be at least one collision between one UL transmission in eNB1 and a DL transmission in eNB2). If other UL subframes besides the UL subframe 2 are also determined (block 620=No), then flow proceeds to block 625.

In block 625, the eNB2 175-2 determines whether there is overlapping between an operating bandwidth to be used by the eNB2 for DL and the PUCCH region to be used by the eNB1 for UL. If the eNB2's operating bandwidth has no overlapping with the PUCCH region (block 625=No), then the flow proceeds to backhaul signaling 635, where the eNB2 signals to the eNB1 a response 640 indicating there is no overlapping 640-3. The indication of no overlapping 640-3 means the eNB1 PUCCH will not suffer the interference from eNB2's downlink transmission and eNB1 shall know it is not necessary for the eNB2 to adopt any behaviors to protect eNB1's PUCCH.

Conversely, if the operating bandwidth of eNB2 is larger than or equal to that of eNB1 (block 625=Yes), then there will be overlapping UL and DL bandwidths, and the flow proceeds to block 630. In block 630, the eNB2 shall avoid scheduling PDSCH or ePDCCH on the indicated PUCCH region in the DL subframe with the same number of the recorded UL subframes except UL subframe 2 (since subframe 2 always has uplink subframes and therefore there is no possibility of DL-to-UL interference). In an exemplary embodiment, the eNB2 uses the PUCCH pattern information 607 to determine where in the operating bandwidth of the eNB2 the PUCCH regions would fall. The PUCCH regions are at the two edges of the UL bandwidth for the eNB1, so the eNB2 could map these regions onto the bandwidth to be used by the eNB2. The eNB2 then would not schedule DL transmission in the bandwidth regions overlapped with eNB1's PUCCH region. Furthermore, the eNB2 may also mute DL transmission in this subframe or reconfigure the subframe to perform UL transmission. For muting the DL transmission or reconfiguring the UL transmission, the eNB2 could use only the (e.g., indication of) dynamic UL/DL reconfiguration set 607-4 from the PUCCH pattern information. It is further noted that in an example where the PUCCH pattern information 607 only contains an indication of the dynamic UL/DL reconfiguration set 607-4, determining in block 625 whether any UL subframes in the DL-heaviest (with the most DL subframes) TDD UL/DL configuration from the dynamic UL/DL reconfiguration set conflicts with DL subframes to be used by the eNB2. If there is a conflict, PUCCH transmission for eNB1 in this subframe may suffer the interference from eNB2's downlink transmission. Typically, the operating bandwidth 607-1, the operating central frequency 607-2, and the configured PUCCH region size 607-3 may not be used in block 625 for embodiments where muting the DL transmission or reconfiguring the UL transmission is performed.

It should be noted that muting the DL transmission may mean that the entire DL subframe is muted (e.g., no transmission is performed), although it is possible to use a so-called "almost blank subframe" (ABS). ABSs are subframes without DL transmission except downlink reference signals. Ideally, ABSs would be completely blank in order to remove as much interference as possible. However, one still wants to balance the gains from interference reduction with the loss of transmission resources (e.g., from being unable to transmit PDSCH data in the ABSs). Furthermore, a desire for backwards compatibility means that cells should remain accessible and measurable for Rel-8/9 UEs. CRS is at least transmitted in ABS subframes so legacy UEs can use it for various measurements. In addition, PHICH is also transmitted in ABS subframes to avoid shutting off the corresponding uplink subframes. Nonetheless, even with these transmissions, the ABSs can contain much less energy than normal subframes and, thus, reduce interference. A response 640 is sent by the eNB2 to the eNB1 via backhaul signaling 635 to confirm the scheduling avoidance 640-1. The indication of scheduling avoidance 640-1 means the eNB2 will use muting a DL transmission, reconfiguring for UL or just avoid scheduling in the overlapping region. At the eNB1 side, after receiving this response, the eNB1 shall know its PUCCH will be protected by eNB2. In that sense, eNB1 may not need to perform UL-DL interference mitigation (as described below).

Block 645 is optional, but the eNB1 may, based on the response 640, perform or not perform UL interference mitigation techniques. For instance, the mitigation techniques would not be performed (block 646) if the response 640 indicates there is scheduling avoidance 640-1 or no overlapping 640-3, but would be performed (block 647) if the response 640 indicates no scheduling avoidance 640-2. The interference techniques 650 can include UL power boosting 650-1 (e.g., the eNB1 instructs the UE 110 increase power higher than what would have been used for the A/N feedback signaling 660, increasing power so that power used in the uplink transmission is increased from an originally determined power to a power that is higher than the originally determined power) or improving the reliability of PUCCH 650-2. Note that the DL transmission 655 may also include signaling from the eNB1 to the UE 110-1 in order to signal the UE 110-1 to perform the uplink power boosting in the A/N feedback performed in signaling 660.

In signaling 655, the eNB1 175-1 transmits DL data to the UE using, e.g., PDSCH. In signaling 660, the UE 110 transmits the corresponding ACK/NACK (A/N) feedback to eNB1. It is noted that signaling 660 occurs at certain subframes. Meanwhile, in those certain subframes, the eNB2 175-2 transmits (665) to UE 110-2 DL information with no scheduled DL transmissions in DL regions overlapped with eNB1's PUCCH region (e.g., but with DL transmission in the regions that do not correspond to the PUCCH regions) or with muted DL transmissions in this subframe or reconfigures this subframe for UL transmission. Should the subframe be reconfigured for UL transmission, block 665 is assumed to be signaling from the eNB2 to the UE 110-2 to inform the UE of the reconfiguration, and the UE 110-2 would then subsequently perform an UL transmission in signaling 670.

It should be noted that a network node (NN) 690 may also be used, e.g., to "relay" signaling 605 and 635 from the eNB1 175-1 to the eNB2 175-2. Such a network node 690 may be a serving gateway (e.g., element 190 in FIG. 1) and the interface used could be the S1 interface over the network 131.

There are a number of possibilities on how to effectuate the backhaul signaling to enable the exemplary embodiments. One possibility is to provide specification changes.

The following two examples provide specification changes. FIG. 7 is an example of a portion of a modified ENB CONFIGURATION UPDATE message, where the original message is from section 9.1.2.8 of 3GPP TS 36.423 V11.6.0 (2013 September). The ENB CONFIGURATION UPDATE message is sent by an eNB to a peer eNB to transfer updated information for a TNL association. The extension to the ENB CONFIGURATION UPDATE message includes the following:

1) An IE/group name of Information for eIMTA, and a range from zero to <maxnoofNeighbours>;
2) An IE/group name of Bandwidth with a presence that is optional (O), with an IE type of integer (INTEGER) and a semantics description of Bandwidth of the neighbour cell;
3) An IE/group name of PUCCHRegion with a mandatory (M) presence, an integer IE type, and a semantics description of "PUCCH occupied PRB size of the neighbour cell, counted in single side from the edge of the neighbour cell band"; and
4) The UL/DL reconfiguration set IE/group name with mandatory (M) presence, a range from one to three in this example, an IE type of integer, and a semantics description of "Specified UL/DL reconfiguration set 1, 2, 3 etc.".

Another example is illustrated by FIG. 8, which shows a modified LOAD INFORMATION message, where the original message is from section 9.1.2.1 of 3GPP TS 36.423 V11.6.0 (2013 September). This message is sent by an eNB to neighboring eNBs to transfer load and interference co-ordination information.

The above message changes are merely exemplary. It is also possible to involve other messages or to create a new message or IE. The extension to the ENB CONFIGURATION UPDATE message includes the following:

1) An IE/group name of Information for eIMTA, and a range from zero to <maxnoofNeighbours>;
2) An IE/group name of Bandwidth with a presence that is optional (O), with an IE type of integer (INTEGER) and a semantics description of Bandwidth of the neighbour cell;
3) An IE/group name of EARFCN, with a mandatory (M) presence, a reference of section 9.2.6 (of 3GPP TS 36.423), and a semantics description of EARFCN for TDD;
4) An IE/group name of PUCCHRegion with a mandatory (M) presence, an integer IE type, and a semantics description of "PUCCH occupied PRB size of the neighbour cell, counted in single side from the edge of the neighbour cell band"; and
5) The UL/DL reconfiguration set IE/group name with mandatory (M) presence, a range from one to three in this example, an IE type of integer, and a semantics description of "Specified UL/DL reconfiguration set 1, 2, 3 etc.".

The EARFCN is the E-UTRA Absolute Radio Frequency Channel Number, which defines the carrier frequency used in a cell for a given direction (UL or DL) in FDD or for both UL and DL directions in TDD. The relation between EARFCN and carrier frequency (in MHz) are defined in 3GPP TS 36.104.

The exemplary embodiments provide one or more of the following non-limiting advantages:

(1) Provide benefits from dynamic TDD UL/DL reconfiguration;
(2) Helpful for UL-DL interference mitigation; and/or
(3) Guarantee the reliability of PUCCH in case of dynamic TDD UL/DL reconfiguration.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third Generation Partnership Project
ABS Almost Blank Subframe
ACK Acknowledge
A/N ACK/NACK
ARFCN Absolute Radio-Frequency Channel Number
CRS Cell-specific Reference Signal
DCI Downlink control information
DL Downlink (from eNB to UE)
EARFCN E-UTRA Absolute Radio Frequency Channel Number
eIMTA Enhanced Interference Management and Traffic Adaptation
ePDCCH enhanced PDCCH
eNB evolved Node B (LTE base station)
E-UTRA Evolved Universal Terrestrial Radio Access
HARQ Hybrid Automatic Repeat request
IE Information Element
LTE Long term evolution
ms milliseconds
NACK Negative ACK
PDCCH Physical downlink control channel
PDSCH Physical downlink shared channel
PRB Physical Resource Block
PUCCH Physical uplink control channel
PUSCH Physical uplink shared channel
RAN Radio Access Network
RB Resource Block
Rel Release
RRC Radio resource control
SIB System Information Block
TDD Time Division Duplexing
TNL Transport Network Layer
UE User equipment
UL Uplink (from UE to eNB)

What is claimed is:

1. A method, comprising:
receiving, via backhaul signaling and at a second base station, information defining a physical uplink control channel pattern to be used by a first user equipment to transmit a physical uplink control channel signaling to a first base station, wherein the information is received from the first base station; and in response to a determination that physical uplink control channel regions overlap downlink regions in a downlink bandwidth to be used by the second base station for a downlink transmission to a second user equipment, performing downlink transmission avoidance by the second base station by at least not scheduling downlink transmission in the downlink regions in the downlink bandwidth that overlap with the physical uplink control channel regions or reconfiguring a subframe for uplink transmission.

2. The method of claim 1, wherein the information defining the physical uplink control channel pattern comprises one or more of the following: operating bandwidth of the first base station, operating central frequency of the first base station, configured physical uplink control channel region size for the first base station, or a dynamic uplink-downlink reconfiguration set used by the first base station.

3. The method of claim 2, wherein the physical uplink control channel region size is in terms of a number of resource blocks.

4. The method of claim 1, further comprising: sending, from the second base station to the first base station, a response indicating one of scheduling avoidance is to be performed, no scheduling avoidance is to be performed, or there is no overlapping in regions of bandwidth.

5. The method of claim 1, wherein the information defining the physical uplink control channel pattern comprises a current uplink-downlink reconfiguration set; and wherein the method further comprises in response to a determination by the second base station that physical uplink control channel protection will not be performed, not performing the downlink transmission avoidance for the current uplink-downlink reconfiguration set; and wherein the response indicates that there will be no scheduling avoidance.

6. The method of claim 1, further comprising:
selecting, by the second base station and from an uplink-downlink reconfiguration set of indications of uplink-downlink configurations, an uplink-downlink configuration with a highest number of downlink subframes;
determining, by the second base station, one or more uplink subframe numbers in the selected uplink-downlink configuration;
in response to the one or more uplink subframe numbers only being uplink subframes in all time-division duplex uplink-downlink configurations, not performing, by the second base station, the downlink transmission avoidance for protection of physical uplink control channel; and
in response to the one or more uplink subframe numbers comprising uplink subframes other than uplink subframe only being uplink in all time-division duplex uplink-downlink configurations, performing, by the second base station, the downlink transmission avoidance for protection of physical uplink control channel.

7. An apparatus, comprising:
at least one processor;
at least one memory storing program code;
wherein the at least one memory storing the program code is configured, when executed by the at least one processor, to cause the apparatus to at least:
receive, via backhaul signaling, information defining a physical uplink control channel pattern to be used by a first user equipment to transmit a physical uplink control channel signaling to a first base station, wherein the information is received from the first base station; and responsive to a determination that physical uplink control channel regions overlap downlink regions in a downlink bandwidth to be used for a downlink transmission to a second user equipment, perform downlink transmission avoidance by at least not scheduling downlink transmission in the downlink regions in the downlink bandwidth that overlap with the physical uplink control channel regions or reconfiguring a subframe for uplink transmission, wherein the apparatus comprises, or is comprised in, a second base station.

8. The apparatus of claim 7, wherein the information is received via an X2 interface.

9. The apparatus of claim 7, wherein the information is received via an S1 interface.

10. The apparatus of claim 7, wherein the information defining the physical uplink control channel pattern comprises one or more of the following: operating bandwidth of the first base station, operating central frequency of the first base station, configured physical uplink control channel region size for the first base station, or a dynamic uplink-downlink reconfiguration set used by the first base station.

11. The apparatus of claim 10, wherein the physical uplink control channel region size is in terms of a number of resource blocks.

12. The apparatus of claim 7, wherein the apparatus is further caused to at least send to the first base station a response indicating one of scheduling avoidance is to be performed, no scheduling avoidance is to be performed, or there is no overlapping in regions of bandwidth.

13. The apparatus of claim 7, wherein the information defining the physical uplink control channel pattern comprises a current uplink-downlink reconfiguration set,
wherein the apparatus is further caused to at least, responsive to a determination by the apparatus that physical uplink control channel protection will not be performed, inhibit performance of the downlink transmission avoidance for the current uplink-downlink reconfiguration set, and wherein a response is sent from the apparatus toward the first base station indicating that there will be no scheduling avoidance.

14. The apparatus of claim 7, wherein the apparatus is further caused to at least:
select, at the apparatus and from an uplink-downlink reconfiguration set of indications of uplink-downlink configurations, an uplink-downlink configuration with a highest number of downlink subframes;
determine one or more uplink subframe numbers in the selected uplink-downlink configuration;
responsive to the one or more uplink subframe numbers only being uplink subframes in all time-division duplex uplink-downlink configurations, inhibit performance of the downlink transmission avoidance for this uplink-downlink reconfiguration set; and
responsive to the one or more uplink subframe numbers comprising uplink subframes other than uplink subframe only being uplink in all time-division duplex uplink-downlink configurations, perform the downlink transmission avoidance for this uplink-downlink reconfiguration set.

15. An apparatus, comprising:
at least one processor;
at least one memory storing program code;
wherein the at least one memory storing the program code is configured, when executed by the at least one processor, to cause the apparatus to at least:
  transmit, towards a second base station and via backhaul signaling, information defining a physical uplink control channel pattern to be used by a user equipment to transmit a physical uplink control channel signaling to the first apparatus;
  receive a response from the second base station; and
  based on the response, perform one or more interference mitigation techniques for an uplink transmission to be performed by the user equipment to transmit the physical uplink control channel signaling to the apparatus, the apparatus comprising, or comprised in, a first base station.

16. The apparatus of claim 15, wherein the information defining physical uplink control channel pattern comprises one or more of the following: operating bandwidth of the first base station, operating central frequency of the first base station; configured physical uplink control channel region size for the first base station, or a dynamic uplink-downlink reconfiguration set used by the first base station.

17. The apparatus of claim 15, wherein the user equipment is a first user equipment; wherein the response comprises an indication the second base station will perform scheduling avoidance or there is no overlap between a bandwidth to be used by the first user equipment in the uplink transmission and a bandwidth to be used by the second base station in a downlink transmission to a second user equipment; and wherein the one or more interference mitigation techniques are not performed by the first base station.

18. The apparatus of claim 15, wherein the response comprises an indication the second base station will not perform scheduling avoidance; and wherein the one or more interference mitigation techniques are performed by the first base station.

19. The apparatus of claim 15, wherein the one or more interference mitigation techniques comprise signaling the first user equipment to perform a power boosting for the uplink transmission so that power used in the uplink transmission is increased from an originally determined power to a power that is higher than the originally determined power; and
  wherein the apparatus is further caused to at least receive at the first base station the uplink transmission from the first user equipment on the physical uplink control channel.

20. The apparatus of claim 15, wherein the one or more interference mitigation techniques comprise improving a reliability of the physical uplink control channel; and
  wherein the apparatus is further caused to at least receive at the first base station the uplink transmission from the first user equipment on the physical uplink control channel.

* * * * *